(12) United States Patent
Joho (10) Patent No.: US 8,008,895 B2
(45) Date of Patent: Aug. 30, 2011

(54) STATIC EXCITER SYSTEM FOR A GENERATOR AND METHOD OF OPERATION

(75) Inventor: Reinhard Joho, Rombach (CH)

(73) Assignee: ALSTOM Technology Ltd., Baden (CH)

( * ) Notice: Subject to any disclaimer, the term of this patent is extended or adjusted under 35 U.S.C. 154(b) by 635 days.

(21) Appl. No.: 11/577,889

(22) PCT Filed: Oct. 13, 2005

(86) PCT No.: PCT/EP2005/055231
§ 371 (c)(1),
(2), (4) Date: May 15, 2007

(87) PCT Pub. No.: WO2006/045703
PCT Pub. Date: May 4, 2006

(65) Prior Publication Data
US 2007/0296275 A1 Dec. 27, 2007

(30) Foreign Application Priority Data
Oct. 28, 2004 (CH) .................................. 1780/04

(51) Int. Cl.
*H02P 9/10* (2006.01)
(52) U.S. Cl. ................... 322/59; 322/28; 363/34
(58) Field of Classification Search ............ 322/59, 322/60, 61, 63, 65, 66, 24, 25, 28, 37, 99; 363/34
See application file for complete search history.

(56) References Cited

U.S. PATENT DOCUMENTS

| | | |
|---|---|---|
| 3,316,479 A | 4/1967 | Frierdich |
| 3,818,317 A | 6/1974 | Isono et al. |
| 4,264,856 A | 4/1981 | Frierdich et al. |
| 4,410,848 A | 10/1983 | Frierdich |
| 5,510,695 A * | 4/1996 | Tanaka et al. .............. 322/25 |
| 6,339,316 B1 * | 1/2002 | Eguchi et al. ............... 322/59 |
| 6,933,704 B2 * | 8/2005 | Nelson et al. ............... 322/29 |

(Continued)

FOREIGN PATENT DOCUMENTS

| | | |
|---|---|---|
| GB | 1359130 | 7/1974 |
| SU | 408448 | 12/1973 |
| SU | 1312715 | 5/1987 |

OTHER PUBLICATIONS

"Phase Control Thyristor,", Sep. 1, 2000, ABB Semiconductors AG, p. 1.

(Continued)

*Primary Examiner* — Nicholas Ponomarenko
(74) *Attorney, Agent, or Firm* — Cermak Nakajima LLP; Adam J. Cermak (57) ABSTRACT

A static exciter system (20) for the field winding (17) of a generator (16) which is connected to a grid system via a busbar (19) includes a first device (12, 18, 21) for production of a DC voltage, which is connected to the field winding (17) and together with the field winding (17) form an exciter circuit, as well as a second device (23; 29, C1, . . . , C3) for emission of electrical energy, which second device (23; 29, C1, . . . , C3) briefly feeds additional energy into the exciter circuit when required. An exciter system such as this results in the capability to briefly increase the excitation in a simple, functionally reliable and space-saving manner, by inserting a forward-biased diode (22) into the exciter circuit, and by the capability to connect the second device (23) to the diode (22), in the reverse-bias direction, in order to feed the energy into the exciter circuit.

26 Claims, 7 Drawing Sheets

U.S. PATENT DOCUMENTS

| | | | | |
|---|---|---|---|---|
| 7,154,249 | B2* | 12/2006 | Velhner et al. | 322/59 |
| 7,388,300 | B2* | 6/2008 | Anghel et al. | 290/39 |
| 7,456,510 | B2* | 11/2008 | Ito et al. | 290/44 |
| 7,592,786 | B2* | 9/2009 | Xu et al. | 322/59 |

OTHER PUBLICATIONS

"Rectifier Diode,", Nov. 1, 2000, ABB Semiconductors AG, p. 1.

Technical Information, revision: 2.0, eupec, Apr. 11, 2004, p. 1.

"Boostcap Ultracapacitor,", Maxwell Technologies, San Diego, CA, US.

"Mitsubishi Gate Turn-off Thyristors FG6000AU-120D High Power Inverter Use Press Pack Type," Aug. 1998, Mitsubishi Electric.

Search Report for Swiss Patent App. No. CH 1780/04 (Feb. 22, 2005).

International Search Report for PCT Patent App. No. PCT/EP2005/055231 (Apr. 5, 2006).

\* cited by examiner

STATIC EXCITER SYSTEM FOR A GENERATOR AND METHOD OF OPERATION

This application is a U.S. National Stage filed under 35 U.S.C. §371 of International application number PCT/EP2005/055231, filed 13 Oct. 2005, which claims priority to Swiss Application number 01780/04, filed 28 Oct. 2004.

BACKGROUND

1. Field of Endeavor

The present invention relates to the field of generator technology. It relates in particular to a static exciter system, and to a method for operation of an exciter system such as this.

2. Brief Description of the Related Art

Figure 1:
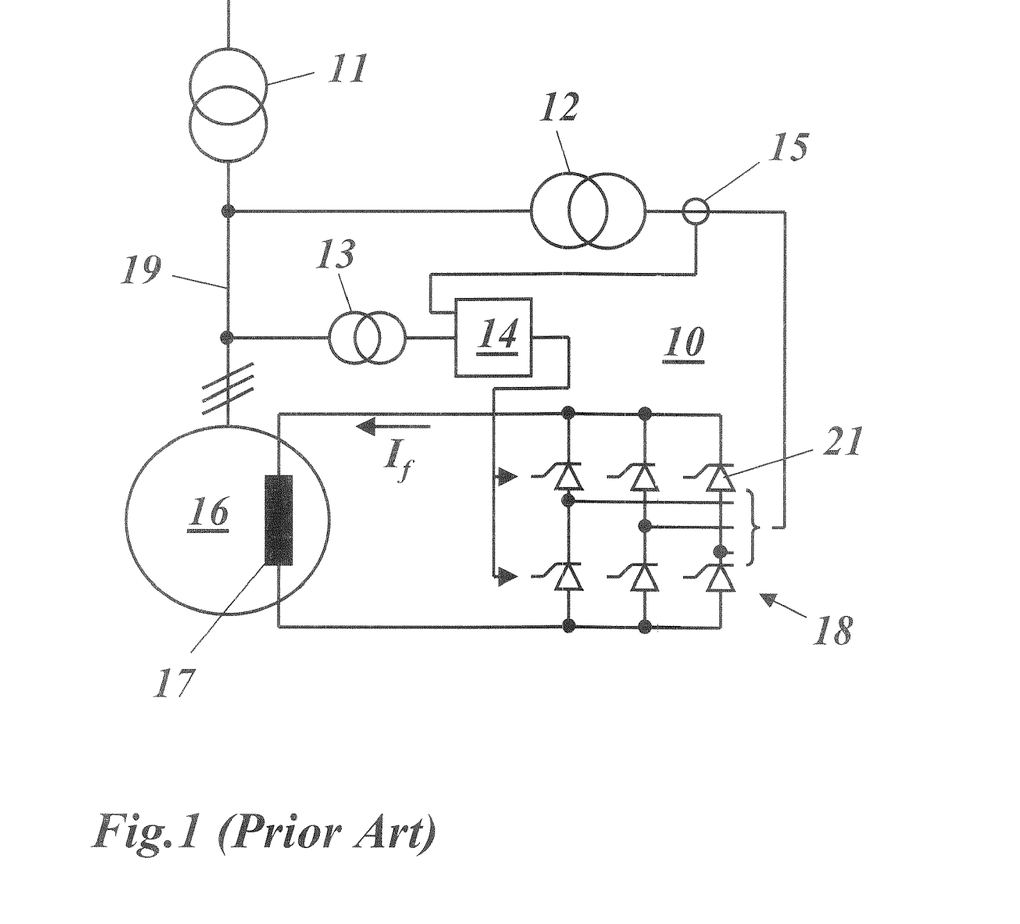
FIG. 1 shows a simplified circuit diagram of a static exciter system according to the prior art.

Static exciter systems for feeding the field winding of a generator are widely used. They are distinguished by their robustness and a short response time. A static exciter system of the known type is shown in FIG. 1. The static exciter system 10 in FIG. 1 is associated with a generator 16, which is connected to a grid system (not shown in FIG. 1) via a (3-phase) busbar 19 and a machine transformer 11. The static exciter system 10 is used to feed the field winding 17 of the generator 16 and includes an exciter transformer 12, which is connected to the busbar 19 and whose output AC voltage is converted to a DC voltage by means of a thyristor bridge 18 which is fitted with thyristors 21. The thyristors 21 in the thyristor bridge 18 are driven, and the magnitude of the DC voltage is thus controlled, by means of an automatic voltage regulator (AVR) 14 on the basis of the generator voltage which is present on the busbar 19 that is tapped off via a voltage transformer 13, and of the current flowing in the excitation device 10 and measured via a current transformer 15. The DC voltage produced by the thyristor bridge 18 drives a field current $I_f$ through the field winding 17.

The response of the exciter system 10 is increased by setting the output voltage of the exciter transformer 12 higher than the nominal level, so that it is possible to ensure the necessary current gradient $dI_f/dt$ (response time) and the necessary maximum value $I_{fmax}$ (brief increase in the wattless component) by a temporary transition to full-wave control of the thyristor bridge 18. The corresponding ceiling factor, that is to say the ratio of the maximum field voltage to the rated field voltage, is in the range of 1.5 to 2.0. A limit value such as this is generally normal in order to cope with normal grid-system disturbances.

Despite this over-design, problems occur in conventional static exciter systems, for the following reasons: grid-system disturbances are frequently caused by short circuits in the transmission lines. Short circuits such as these reduce the voltage in the relatively close area of the grid system and in the nearby power stations. Since the exciter transformer is fed from the generator busbar, it likewise sees a reduced voltage. If automatic redosing (in short-circuit conditions) is successful within a predetermined time window, automatic reconnection to the grid system can take place. In order to guarantee the stability of the generator/grid system after reconnection, it would be desirable to introduce a brief wattless-component surge into the returning grid system. This requires the generator to be in an over-excited state. However, this can be achieved only partially because the voltage which remains during the short circuit and shortly after it does not allow a brief field-current surge to be built up. Even the ceiling factor that is incorporated cannot ensure adequate excitation in all circumstances during this time period.

The document U.S. Pat. No. 3,818,317 describes series feeding of a capacitor voltage to the analog signal loop of the exciter system. This feed is triggered by an under-voltage relay which samples the generator voltage. The signal modified in this way is applied to the input of the automatic voltage regulator (AVR). A brief increase in the power in the exciter circuit by feeding in from an additional energy source is not mentioned.

U.S. Pat. No. 6,339,316 describes on the one hand a capacitor-assisted uninterruptible power supply on the AC voltage side of the exciter supply (FIGS. 1-4), and on the other hand a capacitor which is charged with direct current and is connected in parallel with the supply line for the field winding (FIGS. 5-8). In both arrangements, the availability of the generator is adversely affected to a major extent, because complete excitation fails when one of the described components in the arrangements fails. The capacitor which is connected to the field winding uses a semiconductor switch to commutate the current away from the thyristor 10, and back again to the thyristor 10. This can lead to voltage spikes and to a malfunction or damage to the thyristors or the field winding of the generator.

SUMMARY

One of numerous aspects of the present invention includes providing a static exciter system with the capability to briefly increase the excitation ("excitation boosting"), which avoids the disadvantages of known exciter systems and is distinguished by high functional reliability and a simple, space-saving design, and to specify a method for its operation.

Another aspect of the present invention includes the provision of second means for emission of electrical energy in the static exciter system, which second means feeds additional energy into the exciter circuit briefly when required, in that a forward-biased diode is inserted into the exciter circuit, and in that the second means can be connected to the diode, in the reverse-bias direction, in order to feed the energy into the exciter circuit.

One refinement of the system embodying principles of the present invention is distinguished in that a first means includes an exciter transformer, which is connected to the busbar of the generator, and a rectifier circuit which is connected to the output of the exciter transformer, in that the rectifier circuit is a controllable rectifier circuit, in particular a thyristor bridge, an automatic voltage regulator is provided for control of the rectifier circuit or thyristor bridge, and the automatic voltage regulator is connected on the input side via a voltage transformer to the busbar of the generator, the second means can be connected to the diode by means of a switch, the switch is a semi-conductor switch, in particular a thyristor (Th), or a semiconductor switch which can be switched off, in particular a GTO or IGBT, and the switch can be operated on the basis of the generator voltage and/or of the set value of the automatic voltage regulator.

The exciter system need not necessarily be connected to the generator rail. For example, it can also be connected to the internal power station supply. Since, in the end, this is also connected to the grid system, the same comments apply.

A further aspect of the present invention includes that the second means are formed by a chargeable capacitance, in which case, in particular, the capacitance comprises one capacitor or a plurality of capacitors which is or are connected in series. The capacitor energy can be fed into the exciter circuit in a particularly flexible manner if the capacitance comprises a plurality of capacitors which can be connected to the diode independently of one another, by means of appropriate switches.

It is advantageous in terms of space requirement, energy density, reliability and installation costs if the capacitor or capacitors is or are in the form of ultracapacitors or supercapacitors having a specific energy density of 1 to 10 Wh/kg.

By way of example, a charging unit is provided in order to charge the capacitance or the capacitors.

If the brief increase in the excitation is intended to be controlled from a central point, it is advantageous if the switch for the connection of the second means can be operated via a receiver, by means of a wire-based signal or a radio signal.

BRIEF DESCRIPTON OF THE DRAWINGS

The invention will be explained in more detail in the following text with reference to exemplary embodiments and in conjunction with the drawing, in which.

DETAILED DESCRIPTION OF EXEMPLARY EMBODIMENTS

Figure 2:
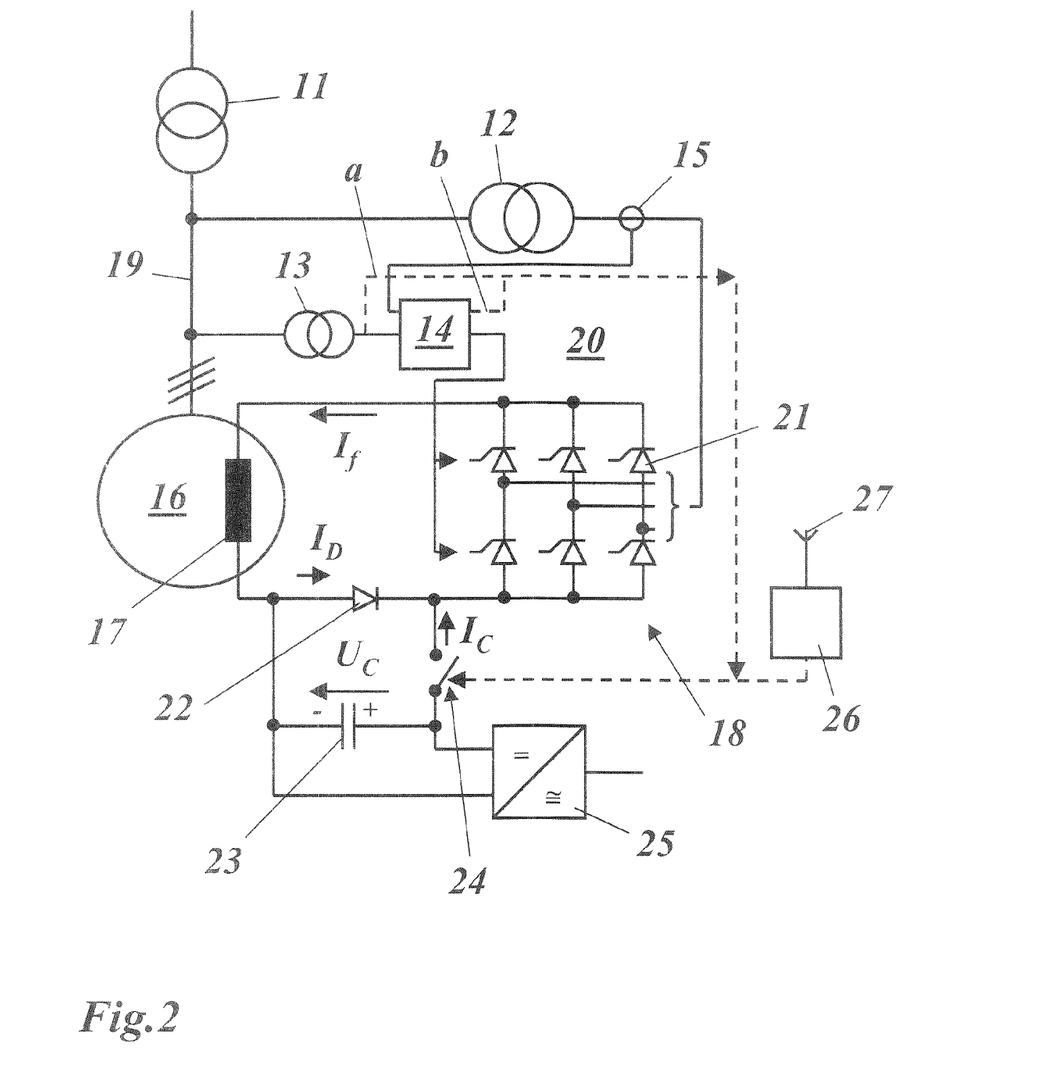
FIG. 2 shows a simplified circuit diagram of a static exciter system according to a first exemplary embodiment of the invention, having a capacitance as the energy source, which can be connected via a switch, in the reverse-bias direction, to a diode in the exciter circuit.

FIG. 2 shows a simplified circuit diagram of a static exciter system according to a first exemplary embodiment of the invention. This is, once again, based on a generator 16 with a field winding 17, which is connected to a grid system via a busbar 19 and a machine transformer 11. The field winding is supplied with field current $I_f$ from a static exciter system 20, which essentially includes an exciter transformer 12 followed by a thyristor bridge 18 which is fitted with thyristors 21. The thyristor bridge 18 is driven by an automatic voltage regulator (AVR) 14, which receives as input variables, on the one hand via a voltage transformer 13, the generator voltage applied to the busbar 19 and, on the other hand via a current transformer 15, the current flowing in the exciter system. The output side of the thyristor bridge 18 is connected to the field winding 17 and, together with it, forms an exciter circuit.

A diode 22 is installed in the forward-bias direction in the exciter circuit. A chargeable capacitance 23 can be connected by a switch 24 in parallel with the diode 22, with the capacitance 23 being connected in the reverse-bias direction of the diode 22. The capacitance 23 can be charged via a charging unit 25 connected to it. The switch 24 can be driven in various ways, as is indicated by various dashed lines in FIG. 2.

Figure 3:
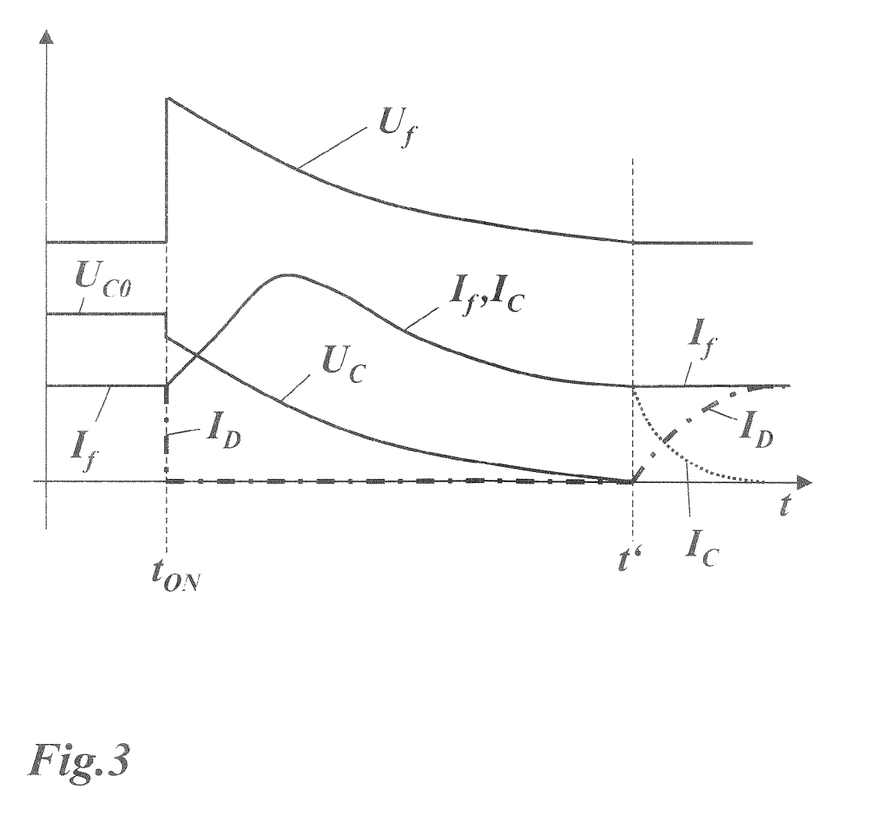
FIG. 3 shows examples of waveforms of the field voltage ($U_f$), of the field current ($I_f$), of the capacitor voltage ($U_C$), of the capacitor current ($I_C$) and of the diode current ($I_D$) after the connection of the capacitance ($t_{ON}$) and until the capacitance (t') has been completely discharged.

During normal operation, the diode 22 carries the field current $I_f$ flowing as direct current, and has no influence at all on the operation of the exciter circuit. The capacitance 23 which, for example, is formed from so-called ultracapacitors or supercapacitors, is held at a predetermined capacitor voltage $U_{CO}$ by the charging unit 25. The polarity of the capacitor charge corresponds to the reverse-biased direction of the diode 22. When the switch 24 is closed, the capacitor voltage $U_C$ is additively connected in series with the voltage emitted from the thyristor bridge 18, thus resulting, overall, in a considerably higher field voltage $U_f$ being applied to the field winding 17 (time $t_{ON}$ in FIG. 3). At the same time, the diode 22 becomes reverse-biased, and the diode current $I_D$ (dashed-dotted line in FIG. 3) falls back to zero. The following text assumes, for simplicity reasons, a constant (frozen) control angle for the thyristor bridge 18. Owing to the increased field voltage $U_f$, the field current $I_f$ starts to rise, delayed by the inductance of the field winding 17. The switching on of the switch 24 can be triggered by the voltage at the voltage transformer 13 falling below a predetermined limit value (dashed connection (a) in FIG. 2). This makes it possible to increase the exciter supply, by means of the energy stored in the capacitance 23, when the grid-system voltage falls. While the energy is being fed into the exciter circuit, the capacitance 23 is continuously discharged (fall in capacitor voltage $U_C$ in FIG. 3), until the capacitor voltage $U_C$ is zero (time t' in FIG. 3). The diode 22 then starts to conduct again, and the normal exciter supply remains.

The method of operation of the AVR can continue unchanged. The additional capacitor feed is additionally processed via the exciter current detection, which is always present, in the AVR.

The desired voltage shift is achieved by precharging of the capacitance. The charging voltage may be up to two or more times, in particular up to 3 or more times, the rated value of the exciter voltage. The desired duration of the support is set via the capacitance value. The installed support time (t'-$t_{ON}$) varies in the range 1 to 20 s.

As has already been mentioned above, ultracapacitors or supercapacitors, for example, are used to form the capacitance 23, such as those available under the type designation BOOSTCAP™ from Maxwell Technologies, or under the type designation BCA0010 or PC2500. Ultracapacitors such as these which, for example, have a capacitance of 2600 or 2700 F at a rated voltage of 2.5 V, have various advantages: they are 100% maintenance free. They have an excellent power and energy capacitance (10 times better than electrolytic capacitors). Even if a capacitor fails—which is highly improbable—the consequences can be kept very minor by a modular design using individual capacitors 29 connected in series (see FIG. 5). The size and number of the capacitors are governed by the requirements for the voltage shift and the support time.

By way of example, the diode 22 is installed as a disk-type diode. Failure results in an internal short circuit inside it, which has no effect on the operation of the exciter system.

The switch 24 can be provided with a fuse link in series with it, in order to provide protection against connection to a defective diode.

The blackouts that have occurred recently have shown that there is no capability to briefly feed an increased wattless component into the generally overloaded grid systems. The widely used static excitation with an automatic voltage regulator AVR from the generator busbar which necessarily follows the falling grid-system voltage cannot produce any brief increase in a critical situation such as this. However, a static exciter system according to the invention makes this possible in a simple manner, without any problems, by briefly feeding in stored energy. Measures must, of course, be taken within the stated period to reduce the load on the grid system.

Measures such as these include, for example, load shedding, grid-system disconnection, and the connection of spare generators.

The additional feed by means of the capacitance of the static exciter system according to the invention has the following characteristics and advantages:

- it does not adversely affect the high efficiency of the exciter
- it does not influence the good reliability of the exciter, even if the diode 22 and the additional feed are operating incorrectly
- it does not influence the voltage load in the thyristor bridge
- it does not affect the work of the automatic voltage regulator, connection is independently triggered
- it can be formed in a modular manner from standardized components, in order to fix the maximum additional current (boost current) and the time constant in a simple manner
- the additional voltage is a pure falling DC voltage without any disturbance spikes; there is therefore only a minor additional voltage load in the field winding during the connection phase
- the design is simple and occupies only a small amount of space
- the ultracapacitors that are used by way of example are always relatively reliable and cost relatively little, with respect to their significance in the car industry
- if the device is isolated with a small ground capacitance, the shaft voltages are not influenced
- it represents a simple and robust retrofit kit for existing installations.

As has already been described above, the switch 24 which connects the capacitance 23 to the diode 22 can be triggered by an undervoltage at the generator output (dashed connection (a) in FIG. 2). However, it is also feasible to trigger the switch by a combination of an undervoltage signal and the set value of the automatic voltage regulator 14 (dashed connections (a) and (b) in FIG. 2). Furthermore, it is feasible to increase the excitation rate during normal operation by connection of the capacitance 23. The triggering then takes place by the set value of the automatic voltage regulator 14 (dashed connection (b) in FIG. 2). Finally, it is possible to connect the capacitance 23 by means of a signal which is sent from a grid system monitoring control center in the event of an undervoltage or of an additional requirement for wattless component and, for example, is received as a radio signal via an antenna 27 by means of a receiver 26 (FIG. 2).

Figure 5:
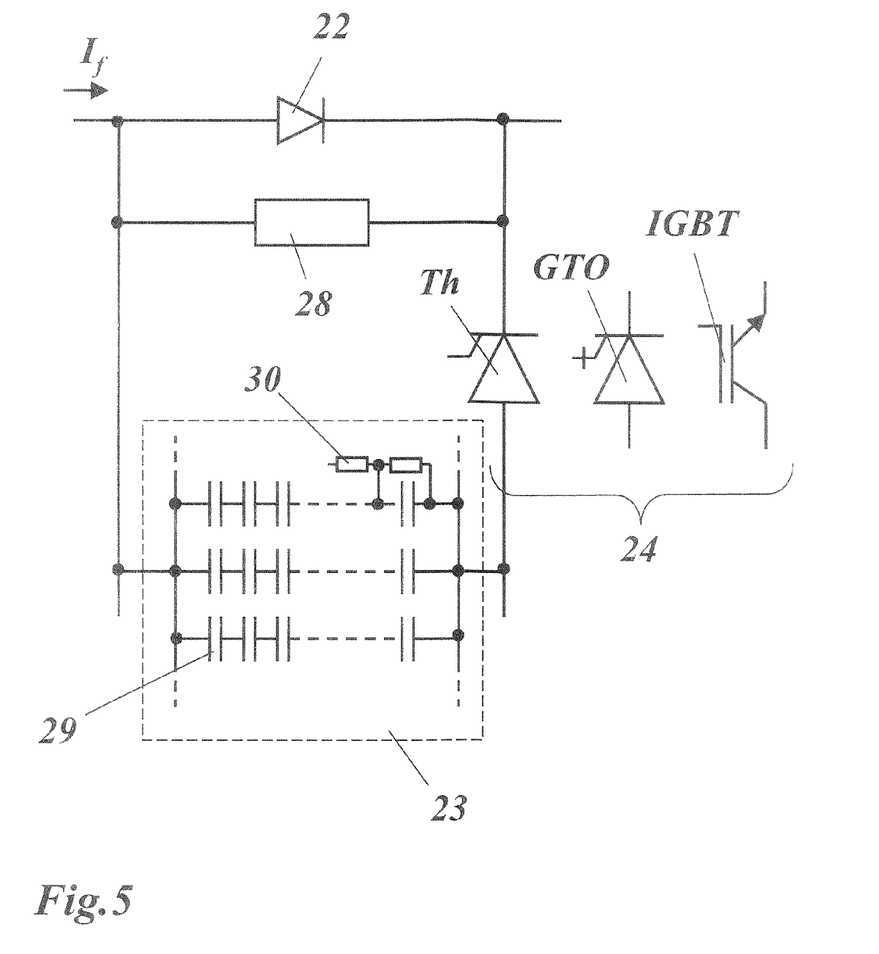
FIG. 5 shows other exemplary embodiments of the invention, in which a resistor connected in parallel with the diode makes it possible to produce a negative field current and/or to change the discharge time of the capacitance, with the capacitance including individual capacitors connected in series, and with different semiconductor switches (thyristors, GTOs, IGBTs) being used as switches.

As is illustrated in FIG. 5, the capacitance 23 can be formed by series and/or parallel connection of individual capacitors 29, for example in the form of ultracapacitors. The series connection of the capacitors 29 can in this case be supplemented by passive balancing (resistors 30 in FIG. 5) or else by active balancing. Furthermore, safety discharging can be provided at the capacitors when the generator is not in operation or when the doors of the cabinet in which the capacitance 23 is accommodated are opened. Finally, modular capacitor banks can be interconnected in order to achieve discharge time durations of more than 10 seconds, depending on the user requirements. This can even extend to such an extent that the voltage of the exciter transformer 12 is reduced and the normal ceiling operation is carried out by the connection of the capacitance 23.

Figure 4:
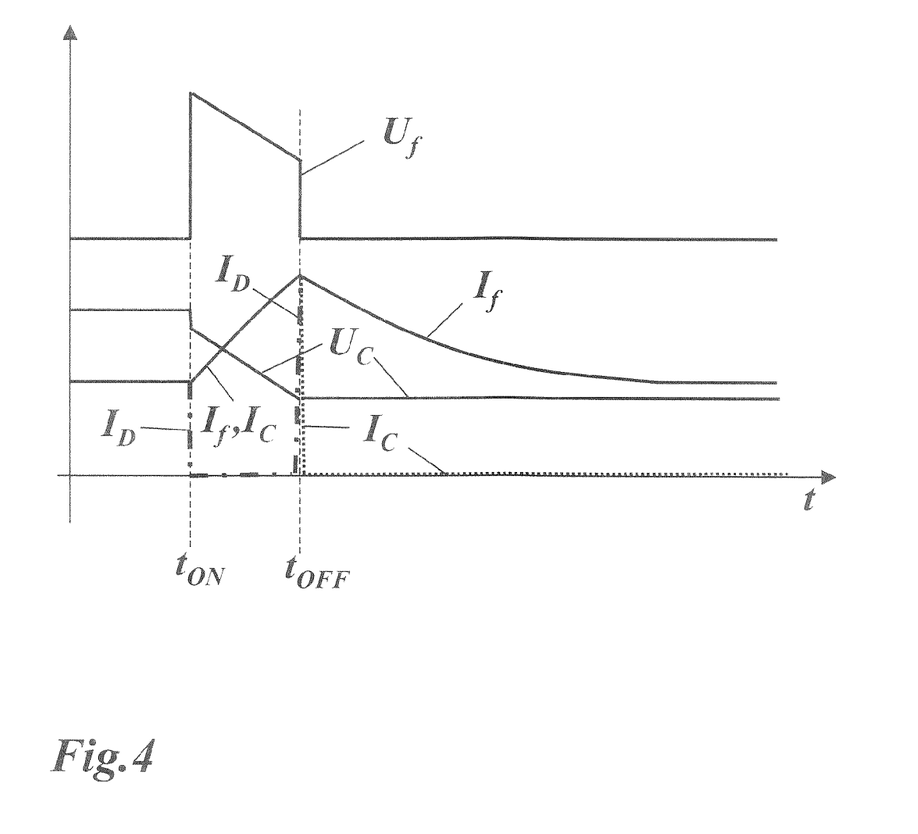
FIG. 4 uses an illustration that is comparable to FIG. 3 to show examples of waveforms of the field voltage ($U_f$), of the field current ($I_f$), of the capacitor voltage ($U_C$), of the capacitor current ($I_C$) and of the diode current ($I_D$) after connection of the capacitance ($t_{ON}$) and until premature disconnection of the capacitance ($t_{OFF}$)

If, as illustrated in FIG. 5, a resistor 28 is connected in parallel with the diode 22, this on the one hand makes it possible to produce a negative field current $I_f$. This allows use in the case of exciter systems having back-to-back parallel-connected bridges for production of a particularly negative field current. On the other hand, the resistor 28 which is connected in parallel when the capacitance 23 is connected makes it possible to influence and set the discharge time constant. The resistance value varies in the same order of magnitude as the resistance value of the field winding 17. Thyristors (Th), GTOs (gate turn off thyristors) or IGBTs (insulated gate bipolar transistors) may be used as the switches 24 (FIG. 5). A conventional thyristor (Th) allows only complete discharging of the capacitance, since the current must pass through zero in order to turn off the thyristor. A GTO or IGBT (which can be switched off) allows the feed of the stored energy into the exciter circuit to be interrupted at any desired time ($t_{OFF}$ in FIG. 4).

Figure 6:
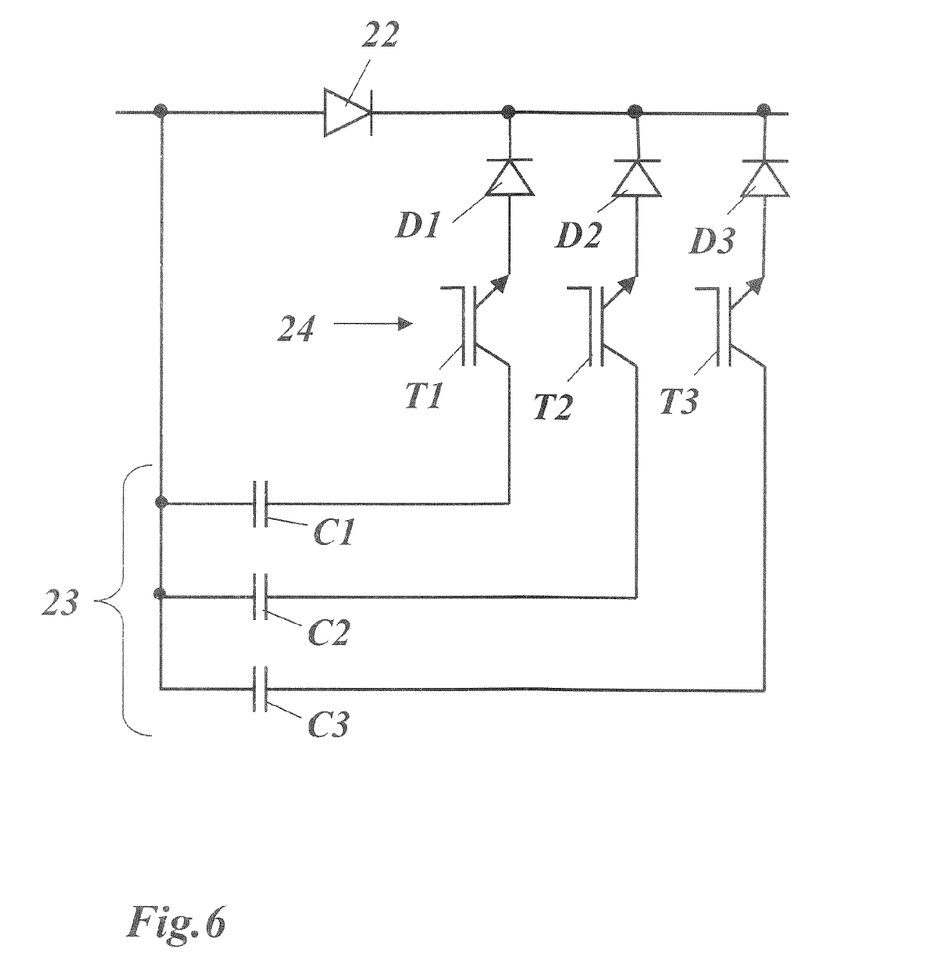
FIG. 6 shows capacitors which can be connected independently, connected in parallel, in order to produce a sequential discharge curve.

As shown in FIG. 6, a plurality of capacitors C1, . . . , C3 of different capacitance and charging voltage can be arranged within the capacitance 23, such that they can be connected individually, by associated switches IGBTs T1, . . . , T3. For example, they may be connected sequentially and/or superimposed in time in order in this way to produce a predetermined exciter current waveform. Diodes D1, . . . , D3 protect the IGBTs T1, . . . , T3 against reverse voltages.

Figure 7:
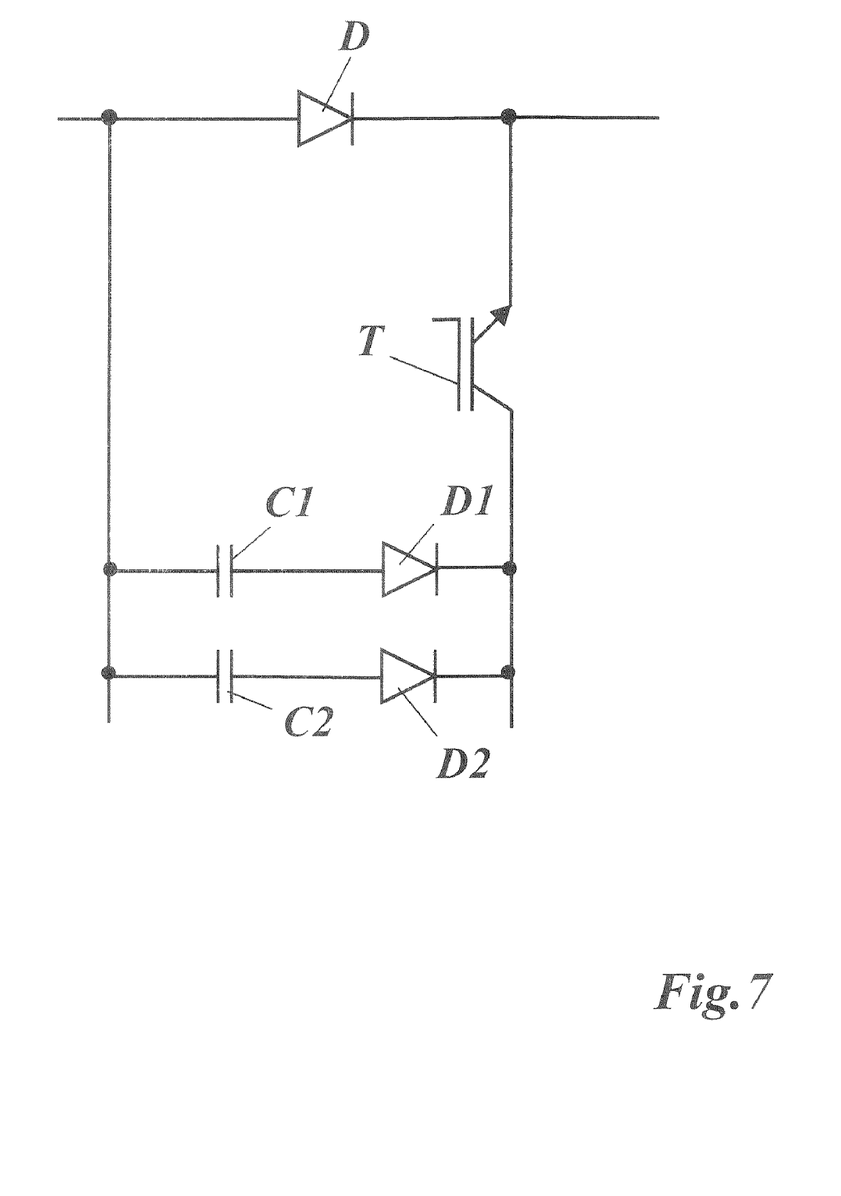
FIG. 7 shows a variant to the circuit illustrated in FIG. 6.

As one example: the capacitor C1 is provided with a small capacitance and a high charging voltage, the capacitors C2 and C3 with a greater capacitance and a lower charging voltage. This combination is associated with a rapid rise of the exciter current, with lasting support. The capacitor C1 may, for example, be formed from film or electrolytic capacitors, with the capacitor C2 and the capacitor C3 being formed by supercapacitors. In the described example, all IGBTs can be switched on at the same time as well; the current decreases then take place automatically. For this situation, a circuit variant as illustrated in FIG. 7 provides a simplification. Capacitor C1 has a high charging voltage and small capacitance, capacitor C2 has a small charging voltage and a greater capacitance. The two capacitors are connected via diodes D1 and D2, arranged in series, to a common switch, in this case represented by the IGBT T.

The isolation for the additional circuit including the diode 22, the capacitance 23, and the charging unit 25 is at the same level as the isolation of the exciter circuit. It is advantageously designed such that this results in a small capacitance to ground.

Two-pole mechanical DC switches can disconnect the capacitors 29 in the capacitance 23 from the diode 22, and thus from the exciter circuit. This would ensure that maintenance tasks can be carried out on the additional circuit during normal generator operation. Switches such as these can also replace the semiconductor switches (Th, GTO, IGBT).

The charging unit 25 can be supplied from the DC or AC auxiliary power supply system in the power station, or from the exciter transformer 12 of the generator 16. Based on the following design example, the charging power for a 300 MVA generator is approximately 1.5 kW for one hour. For difficult grid systems (repetitive disturbances), a high-current charging unit can also be provided, in order to allow the capacitance 23 to be recharged more quickly.

An exciter system for a generator having a rating of 300 MVA is designed as follows, with a BOOSTCAP™ ultracapacitor with a capacitance of 2600 F being used as the individual capacitor 29, based on a rated voltage of 2.5 V and an internal resistance of 1 mΩ (assuming that the control angle remains constant):

| Variable | |
| --- | --- |
| Field current $I_f$ (rated value) | 1500 A |
| Field voltage $U_f$ (rated value) | 350 V |
| Field resistance $R_f$ | 0.23 Ω |
| Field inductance $L_f$ | 0.2 H |
| Capacitor voltage $U_{CO}$ | 500 V |
| Capacitance C | 30 F |
| Number of capacitors connected in series | 250 |
| Number of parallel branches | 3 |
| Total number of capacitors 29 | 750 |
| Max. discharge time (t'-$t_{ON}$) | ≈4 s |
| Max. field current $\hat{I}_f$ | 2400 A |

By way of example, a diode of the 5SDD 60Q2800 type from ABB can be used as the diode 22. According to FIG. 5, either a thyristor of the 5STP 45Q2800 type from ABB or a GTO of the FG600AU120D type from Mitsubishi Electric or an IGBT of the FZ3600R17KE3 type from the company eupec can be used as the switch 24. In this case, only a single component is only ever required even with the generous design considered here.

FIG. 7 shows a variant of the circuit illustrated in FIG. 6, in which two different capacitors (C1, C2) are connected via a common switch or IGBT (T).

| LIST OF REFERENCE SYMBOLS | |
| --- | --- |
| 10, 20 | Static exciter system |
| 11 | Machine transformer |
| 12 | Exciter transformer |
| 13 | Voltage transformer |
| 14 | Automatic voltage regulator (AVR) |
| 15 | Current transformer |
| 16 | Generator |
| 17 | Field winding |
| 18 | Thyristor bridge |
| 19 | Busbar (generator) |
| 21 | Thyristor |
| 22 | Diode |
| 23 | Capacitance |
| 24 | Switch |
| 25 | Charging unit |
| 26 | Receiver |
| 27 | Antenna |
| 28, 30 | Resistor |
| 29 | Capacitor |
| C1, C2, C3 | Capacitor |
| D1, D2, D3 | Diode |
| $I_f$ | Field current |
| $I_C$ | Capacitor current |
| $I_D$ | Diode current |
| $U_f$ | Field voltage |
| $U_C$ | Capacitor voltage |
| T, T1, T2, T3 | IGBT |
| Th | Thyristor |

While the invention has been described in detail with reference to exemplary embodiments thereof, it will be apparent to one skilled in the art that various changes can be made, and equivalents employed, without departing from the scope of the invention. The foregoing description of the preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments as are suited to the particular use contemplated. It is intended that the scope of the invention be defined by the claims appended hereto, and their equivalents.

The invention claimed is:

1. A static exciter system for a field winding of a generator which is connected to a grid system via a busbar, the system comprising:
    first means for production of a DC voltage, the first means supplying a DC voltage to the field winding and together with the field winding forming an exciter circuit when connected thereto;
    second means for emission of electrical energy, the second means for briefly feeding additional energy into the exciter circuit when required;
    a forward-biased diode in the exciter circuit between the first means and the field winding; and
    wherein the second means is additionally for connection to the diode in the reverse-bias direction to feed energy into the exciter circuit.

2. The exciter system as claimed in claim 1, wherein the first means comprises an exciter transformer having an output, configured and arranged to be connected to the generator busbar, and a rectifier circuit connected to the output of the exciter transformer.

3. The exciter system as claimed in claim 2, wherein the rectifier circuit comprises a controllable rectifier circuit, and further comprising:
    a voltage transformer configured and arranged to be connected to the generator busbar; and
    an automatic voltage regulator configured and arranged to control the rectifier circuit, the automatic voltage regulator having an input side connected to the voltage transformer.

4. The exciter system as claimed in claim 3, further comprising:
    a switch connecting the second means to the diode.

5. The exciter system as claimed in claim 4, wherein the switch comprises a semiconductor switch.

6. The exciter system as claimed in claim 4, wherein the switch is configured and arranged to be operated on the basis of the generator voltage, of a set value of the automatic voltage regulator, or of both.

7. The exciter system as claimed claim 1, wherein the second means comprises a chargeable capacitance.

8. The exciter system as claimed in claim 7, wherein the capacitance comprises a plurality of capacitors connected in series, in parallel, or in both.

9. The exciter system as claimed in claim 7, wherein the capacitance comprises a plurality of capacitors and switches, which capacitors can be connected to the diode independently of one another by the switches.

10. The exciter system as claimed in claim 8, wherein the capacitors have a specific energy density of 1 to 10 Wh/kg.

11. The exciter system as claimed in claim 7, further comprising:
    a charging unit configured and arranged to charge the capacitance.

12. The exciter system as claimed in claim 4, further comprising:
   a receiver connected to the switch, the receiver configured and arranged to receive a wire-based signal or a radio signal; and
   wherein the switch is configured and arranged to be operated by the receiver.

13. The exciter system as claimed in claim 1, further comprising:
   a resistor in parallel with the diode.

14. A method for operation of an exciter system, the method comprising:
   providing an exciter system as claimed in claim 1; and
   connecting the second means to the diode when the voltage across the first means is below a predetermined value.

15. A method for operation of an exciter system as claimed in claim 14, wherein:
   providing an exciter system comprises providing an exciter system wherein the first means comprises an exciter transformer having an output, configured and arranged to be connected to the generator busbar, a rectifier circuit connected to the output of the exciter transformer, wherein the rectifier circuit comprises a controllable rectifier circuit, a voltage transformer configured and arranged to be connected to the generator busbar, and an automatic voltage regulator configured and arranged to control the rectifier circuit, the automatic voltage regulator having an input side connected to the voltage transformer; and
   connecting the second means to the diode comprises connecting the second means to the diode based on an undervoltage at the generator and based on a set value of the automatic voltage regulator.

16. A method for operation of an exciter system as claimed in claim 14, wherein providing an exciter system comprises providing an exciter system wherein the first means comprises an exciter transformer having an output, configured and arranged to be connected to the generator busbar, a rectifier circuit connected to the output of the exciter transformer, wherein the rectifier circuit comprises a controllable rectifier circuit, a voltage transformer configured and arranged to be connected to the generator busbar, and an automatic voltage regulator configured and arranged to control the rectifier circuit, the automatic voltage regulator having an input side connected to the voltage transformer; and further comprising:
   increasing the excitation rate during normal operation with the second means; and
   thereafter connecting the second means to the diode based on a set value of the automatic voltage regulator.

17. A method for operation of an exciter system as claimed in claim 14, wherein providing an exciter system comprises providing an exciter system wherein the first means comprises an exciter transformer having an output, configured and arranged to be connected to the generator busbar, a rectifier circuit connected to the output of the exciter transformer, wherein the rectifier circuit comprises a controllable rectifier circuit, a voltage transformer configured and arranged to be connected to the generator busbar, and an automatic voltage regulator configured and arranged to control the rectifier circuit, the automatic voltage regulator having an input side connected to the voltage transformer, a switch connecting the second means to the diode, a receiver connected to the switch, the receiver configured and arranged to receive a wire-based signal or a radio signal, and wherein the switch is configured and arranged to be operated by the receiver; and further comprising:
   monitoring the grid system to which the generator is connected by a control center; and
   operating the switch by a wire-based signal or a radio signal from the control center when an undervoltage occurs, or when there is a requirement for reactive volt-amperes in the grid system.

18. A method for operation of an exciter system as claimed in claim 14, wherein the second means comprises a chargeable capacitance, and further comprising:
   maintaining the capacitance connected to the diode, after connection, until the capacitance has been discharged.

19. A method for operation of an exciter system as claimed in claim 14, wherein the second means comprises a chargeable capacitance, and further comprising:
   maintaining the capacitance connected to the diode for a predetermined time period after connection; and
   thereafter interrupting the connection between the capacitance and the diode.

20. The exciter system as claimed in claim 1, further comprising:
   the field winding, wherein the first means is connected to the field winding and forms an exciter circuit therewith.

21. The exciter system as claimed in claim 2, further comprising:
   the generator busbar, wherein the exciter transformer is connected to the generator busbar.

22. The exciter system as claimed in claim 3, wherein the controllable rectifier circuit comprises a thyristor bridge.

23. The exciter system as claimed in claim 3, further comprising:
   the generator busbar; and
   wherein the voltage transformer is connected to the generator busbar.

24. The exciter system as claimed in claim 5, wherein the semiconductor switch is selected from the group consisting of a thyristor, a gate turn off thyristor, and an insulated gate bipolar transistor.

25. The exciter system as claimed in claim 7, wherein the capacitance comprises a single capacitor.

26. A static exciter system for a field winding of a generator which is connected to a grid system via a busbar, the system comprising:
   a rectifier for production of a DC voltage, the rectifier supplying a DC voltage to the field winding and together with the field winding forming an exciter circuit when connected thereto;
   a chargeable capacitance configured and arranged to emit electrical energy and briefly feed additional energy into the exciter circuit when required;
   a forward-biased diode in the exciter circuit between the rectifier and the field winding; and
   wherein the chargeable capacitance is additionally configured and arranged to connect to the diode in the reverse-bias direction to feed energy into the exciter circuit.

* * * * *